United States Patent Office 3,332,997
Patented July 25, 1967

---

3,332,997
3-PENTACHLOROPHENOXY-1-AMINO-PROPAN-2-OLS
Alfred Renner, Allschwil, and Ulrich Niklaus and Alex von Schulthess, Basel, Switzerland, assignors to Ciba Limited, Basel, Switzerland, a Swiss company
No Drawing. Filed Apr. 25, 1962, Ser. No. 189,995
Claims priority, application Switzerland, May 4, 1961, 5,243/61
5 Claims. (Cl. 260—570.7)

The present invention provides new polyamines containing halogen which are suitable for use as curing agents for epoxy resins and are obtained by reacting polyamines which contain at least one active amine hydrogen atom with glycidyl ethers of halogenated monophenols.

A preferred group of the new polyamines corresponds to the general formula (I)

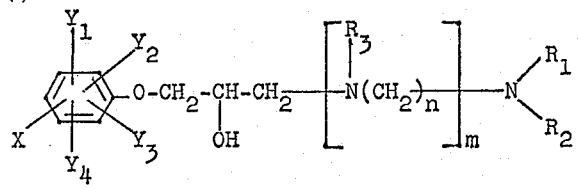

in which X represents a halogen atom, more especially chlorine or bromine; $Y_1$ to $Y_4$ each represents a hydrogen atom, a halogen atom, more especially chlorine or bromine, or a lower alkyl radical with 1 to 4 carbon atoms; $R_1$, $R_2$ and $R_3$ each represents a hydrogen atom or a lower alkyl radical with 1 to 4 carbon atoms; $n$ is a whole number from 2 to 6 and $m$ a whole number from 1 to 6.

The preferred polyamines of the Formula I can be prepared by reacting a glycidyl ether of the general formula (II)

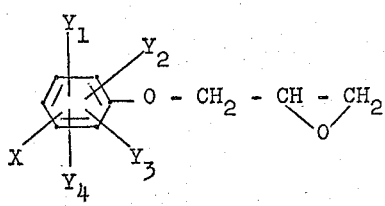

in which X represents a halogen atom, more especially chlorine or bromine; $Y_1$ to $Y_4$ each represents a hydrogen atom, a halogen atom, more especially chlorine or bromine, or a lower alkyl radical with 1 to 4 carbon atoms with a polyamine of the general formula (III)

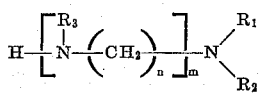

in which $R_1$, $R_2$ and $R_3$ each represents a hydrogen atom or a lower alkyl radical, $n$ is a whole number from 2 to 6 and $m$ a whole number from 1 to 6 if required with heating.

As polyamines containing at least one active hydrogen atom, suitable as starting materials for use in the present process, there may be used primary and secondary polyamines of the aliphatic, cycloaliphatic, araliphatic or aromatic series, such as: aromatic polyamines such, for example, as benzidine, 1:2-phenylenediamine, 1:3-phenylenediamine, 1:4-phenylenediamine, 4:4'-diaminodiphenylmethane, 4:4'-diaminodiphenylamine, 4:4'-diaminodiphenyl-dimethylmethane, 4:4'-diaminodiphenyl sulfide, sulfone or oxide, 4:4'-diaminodiphenylurea, 2:2'-diaminodiphenylmethane, 4:4'-di-[N-monomethylamino]-diphenylmethane, 4:4'-di-[N-monoethylamino]-diphenylmethane, 4:4'-di-[N-monobutylamino]-diphenylmethane; hydrazine and hydrazine derivatives such as phenylhydrazine, 2-phenyl-2-hydroxyethylhydrazine and 2-hydroxyethylhydrazine; heterocyclic polyamines such as piperazine, araliphatic polyamines such, for example, as N-phenylpropylenediamine, N-[2-ethylphenyl]-propylenediamine, N-[4-phenylcyclohexyl]-ethylenediamine, 1:4-bis-[δ-aminobutyl]-tetraethylbenzene, bis-[β-aminoethyl]-durene, bis-[β-amino-n-propyl]-durene, bis-[ω-aminohexyl]-durene, bis-[γ-aminopropyl]-isodurene, 1:4-bis-[β-aminoethyl] - 2:3:6-trimethylbenzene, 1:4-bis-[β-aminoethyl]-benzene, bis-[β-aminoethyl]-mesitylene; ortho-xylylenediamine, para-xylylenediamine, meta-xylylenediamine; cycloaliphatic polyamines such as 1:2-diaminocyclohexane, 1:4-diaminocyclohexane, 1:3-diaminocyclohexane, 1:2-diamino-4-ethylcyclohexane, 1:4-diamino-3:6-diethylcyclohexane, 1 - cyclohexyl-3:4-diaminocyclohexane, bis-[methylamino] - cyclohexane-1:4, dodecahydrobenzidine, 4:4' - diaminodicyclohexylmethane, 4:4'-diaminodicyclohexylpropane, 4:4'-diaminotricyclohexylmethane, N-cyclohexyl - propylenediamine, N - cyclohexylethylenediamine, N:N'-dicyclohexyl-propylenediamine, N:N'-dicyclohexyl-diethylenetriamine, N:N'-di-(2-ethylcyclohexyl)-propylenediamine, N:N'-di-[cyclohexylmethyl]-ethylenediamine; N-hydroxyalkyl-alkylene polyamines such, for example, as N-hydroxyethyl-ethylenediamine, N-hydroxyethylpentamethylenediamine, N-hydroxypropyl-tetramethylenediamine, N-hydroxyethyl-diethylenetriamine, N:N-di-(hydroxyethyl)-diethylenetriamine, N:N''-di(hydroxyethyl)-diethylenetriamine, N-hydroxypropyl-diethylenetriamine, N:N-di(hydroxypropyl)-diethylenetriamine, N'' - di(hydroxypropyl)-diethylenetriamine, N:N:N''-tri(hydroxypropyl) - triethylenetetramine, N-hydroxyethyl-propylenediamine, N - hydroxypropyl-propylenediamine, N-hydroxyethyl - dipropylenetriamine, N:N-di(hydroxyethyl) - dipropylenetriamine, N:N:N'-tri(hydroxyethyl)-triethylenetetramine; cyanoethylated primary polyamines such, for example, as the reaction products of 1 to 2 molecular proportions of acrylonitrile with 1 molecular proportion of ethylenediamine, diethylenetriamine or triethylenetetramine. Preferred use is made of diprimary alkylenepolyamines such, for example, as ethylenediamine, diethylenetriamine, triethylenetetramine, tetraethylenepentamine, trimethylenediamine, hexamethylenediamine or alkylenepolyamines containing a primary amine group as well as a tertiary amino group (such as a dialkylamino group), for example N:N-di-methylethylenediamine, N:N-diethylenediamine, N:N-dimethyl-1:3-propylenediamine, N:N-diethyl-1:3-propylenediamine, N-methyl-N-ethyl-1:3-propylenediamine, N-methyl-N-butyl-1:3 - propylenediamine, N:N-dipropyl-1:3-propylenediamine, N:N-dibutyl-1:3-propylenediamine or N:N-di(2-ethylhexyl)-1:3-propylenediamine.

The glycidyl ethers or glycerol monohalogenohydrin ethers used as starting materials in the present process are derived from halogenated monophenols such as ortho-, meta- or para-chlorophenol, ortho-, meta-or para-bromophenol, monochlorocresols, monobromocresols, monochloroxylenols, and monobromoxylenols, chloronaphthols, bromonaphthols or more especially from more highly halogenated phenols such as 2:4-dichlorophenols, 2:4-dibromophenol, 2:4:6-trichlorophenol, 2:4:6-tribromophenol, tetrachlorophenol, tetrabromophenol or pentachlorophenol. As typical representatives of this group there may be mentioned 2:4-dibromophenyl glycidyl ether, 2:4:6-tribromophenyl glycidyl ether, 2:4:6-trichlorophenyl glycidyl ether, and more especially pentachlorophenyl glycidyl ether.

The reaction of the polyamine with the glycidyl ether is performed by simply mixing them together, advantageously with heating, for example to a temperature ranging from about 80° C. to 200° C., during which it is of advantage to exclude water and carbon dioxide, to prevent the formation of amine hydrates and amine carbonates. If desired, the reaction may be performed in a solvent such, for example, as an aromatic hydrocarbon.

The new polyamines are valuable curing agents for epoxy resins. Compared with the polyamines (such as ethylenediamine, diethylenetriamine or triethylenetetramine) known as curing agents for epoxy resins, the new polyamines are less volatile and toxic, and in many cases they bring about faster curing at room temperature. Furthermore, epoxy resins cured with the new polyamines have the advantage of flame-resistance or reduced combustibility.

Accordingly, the present invention provides curable mixtures of epoxy compounds having an epoxide equivalence greater than 1 and reaction products of polyamines containing at least one active amine hydrogen atom, and also glycidyl ethers of halogenated monophenols as curing agents.

As is known, the conventional methods of manufacturing polyepoxy compounds yield in general mixtures of compounds having molecular weights that differ from one another, and such mixtures further contain a proportion of compounds whose terminal epoxide groups have been partially hydrolyzed. Therefore, the epoxide equivalence of polyepoxy compounds needs not be a whole number, at least 2, but it must in all cases be greater than 1.0.

Epoxy compounds of the kind defined above may be, for example: epoxidized diolefines, dienes or cyclic dienes such as butadiene oxide, vinylcyclohexene dioxide, dicyclopentadiene dioxide; epoxidized polybutadienes; epoxidized compounds containing 2 cyclohexenyl radicals, and 3:4-epoxy-6-methyl-cyclohexylmethyl-3:4-epoxy-6-methyl-cyclohexane carboxylate. Further suitable are basic polyepoxy compounds such as are obtained by reacting primary or secondary aliphatic or aromatic diamines, such as aniline or 4:4'-di(monomethylamino)-diphenylmethane, with epichlorohydrin in the presence of an alkali.

Further suitable are polyglycidyl esters such as are obtained by reacting a dicarboxylic acid with epichlorohydrin or dichlorohydrin in the presence of an alkali. Such polyesters may be derived from aliphatic dicarboxylic acids such as oxalic, succinic, glutaric, adipic, pimelic, suberic, azelaic or sebacic acid, or more especially from aromatic dicarboxylic acids such as phthalic, isophthalic, terephthalic acid, naphthalene-2:6-dicarboxylic acid, diphenyl-ortho:ortho'-dicarboxylic acid, ethyleneglycol-bis(paracarboxyphenyl)-ether or the like. As examples here may be mentioned: diglycidyl adipate and diglycidyl phthalate, as well as diglycidyl esters corresponding to the average formula

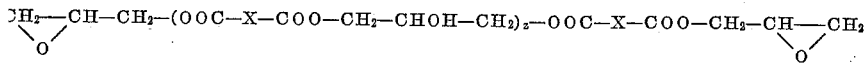

in which X represents an aromatic hydrocarbon radical, such as a phenylene radical, and Z stands for a whole or fractional small number.

Further suitable are polyglycidyl ethers such as obtained by etherifying a dihydric or polyhydric alcohol or diphenol or polyphenol respectively with epichlorohydrin or dichlorohydrin in the presence of an alkali. These compounds may be derived from glycols, such as ethyleneglycol, diethyleneglycol, triethyleneglycol, propyleneglycol-1:2, propyleneglycol-1:3, butaneglycol-1:4, pentanediol-1:5, hexanediol-1:6, hexanetriol-2:4:6, glycerol, and more especially from diphenols or polyphenols such as resorcinol, pyrocatechol, hydroquinone, 1:4-dihydroxy-naphthalene, phenol-formaldehyde condensation products, bis-(4-hydroxyphenyl)-methane, bis(4-hydroxyphenyl)-methyl phenylmethane, bis(4-hydroxyphenyl)-tolylmethane, 4:4'-dihydroxydiphenyl, bis(4-hydroxyphenyl)-sulfone, and more especially from 2:2-bis(4-hydroxyphenyl)-propane.

There may be mentioned ethyleneglycol diglycidyl ethers and resorcinol diglycidyl ethers as well as diglycidyl ethers corresponding to the average formula

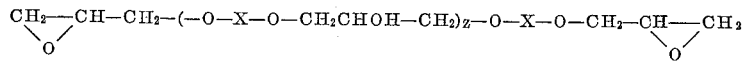

in which X represents an aromatic radical and Z stands for a whole or fractional small number.

Particularly suitable are epoxy resins that are liquid at room temperature, for example those prepared from 4:4'-dihydroxydiphenyl-dimethylmethane containing about 3.8 to 5.8 epoxide equivalents per kg. Such epoxy resins correspond, for example, to the average formula

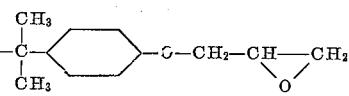

in which Z is a whole or fractional small number, for example from 0 to 2.

The curable mixtures of the invention may be mixed at any stage prior to the curing operation with fillers, plasticizers, coloring matter or the like. Suitable extenders and fillers are, for example, asphalt, bitumen, glass fibers, mica, quartz meal, cellulose, kaolin, finely dispersed silicic acid (Aerosil) or metal powders.

The mixtures containing the epoxy resin and, as curing agent, a polyamine containing halogen, may be used without or with fillers, if desired in the form of solutions or emulsions, as textile assistants, laminating resins, paints, lacquers, dipping resins, casting resins, coating compositions, pore fillers or putties, adhesives, moulding compositions or the like, as well as in the manufacture of such products. The new resins are particularly useful as insulating compounds in the electrical industry.

In the following examples parts and percentages are by weight, the relationship between part by weight and part by volume being the same as that between the kilogram and the liter.

*Example 1*

146 parts of triethylenetetramine are heated to 80° C. with stirring and exclusion of moisture and carbon dioxide and then, while cooling externally, 323 parts of pentachlorophenyl glycidyl ether (melting at 111° C.; containing 2.75 epoxide equivalents per kg.) are added in portions such as to prevent the temperature of the reaction mixture rising above 80° C. The batch is allowed to react for 2 hours longer at 80° C., whereupon it furnishes a quantitative yield of the polyamine of the formula

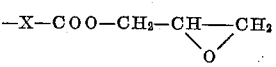

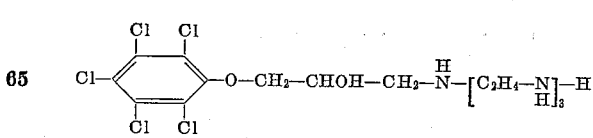

in the form of a light-brown, viscous resin.

67 parts of the halogen-containing polyamine obtained as described above are thoroughly mixed with 133 parts of an epoxy resin which is liquid at room temperature (obtained by condensing 1 mol of 4:4'-dihydroxydiphenyl-dimethylmethane with at least 2 mols of epichlorohydrin in the presence of aqueous sodium hydroxide solution), containing 5.2 gram equivalents of epoxide groups per kg., and the mixture is poured into moulds. After standing for 30 minutes at room temperature the product gels. The resulting, solid casting has the following properties:

Combustibility (VDE) stage: _____ 1.
  (combustion lasts 14 seconds)
Flexural strength _____ 11.0 kg./mm.$^2$.
Impact strength _____ 3.9 cmkg./cm.$^2$.
Heat distortion point according to
  Martens _____ 81° C.
Water absorption (after 4 days at
  20° C.) _____ 0.28%.

When in a comparative experiment a mixture of 223 parts of the epoxy resin described above and 23 parts of triethylenetetramine is cured, solid castings are obtained which have the following properties:

Combustibility (VDE) stage: _____ 0 seconds.
  (combustion lasts longer than 60
    seconds)
Flexural strength _____ 12.5 kg./mm.$^2$.
Impact strength _____ 3.8 cmkg./cm.$^2$.
Heat distortion point according to
  Martens _____ 71° C.
Water absorption (after 4 days at
  20° C.) _____ 0.23%.

*Example 2*

103 parts of diethylenetriamine and 323 parts of pentachlorophenyl glycidyl ether are reacted as described in Example 1, to give a quantitative yield of a very viscid, light-brown resin consisting predominantly of the polyamine of the formula

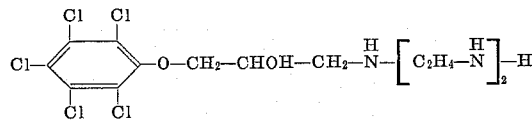

*Example 3*

306 parts of dimethylamino-propylamine and 970 parts of pentachlorophenyl glycidyl ether are reacted as described in Example 1, except that the reaction temperature is 120° C.

There is obtained a quantitative yield of a tacky, solid resin consisting predominantly of the polyamine of the forumla

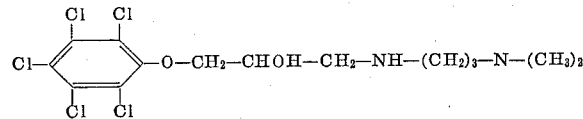

*Example 4*

146 parts of triethylenetetramine and 387 parts of 2:4:6-tribromophenyl glycidyl ether (melting at 108–109° C.); containing 2.34 epoxide equivalents per kg.) are reacted as described in Example 1, to give a quantitative yield of a brown, highly viscous resin consisting substantially of the polyamine of the formula

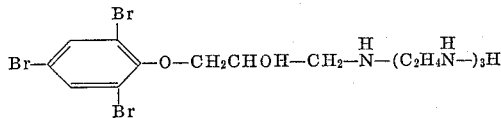

*Example 5*

322 parts of pentachlorophenyl glycidyl ether are added at 80° C. to 60 parts of ethylenediamine. To obtain a homogeneous reaction mixture the whole is heated to 190° C. After cooling, a quantitative yield of a brown, brittle resin is obtained which has a softening point of 110° C. (determined on a Kofler heater) and from which no unreacted ethylenediamine can be removed by distillation; it consists substantially of the polyamine of the formula

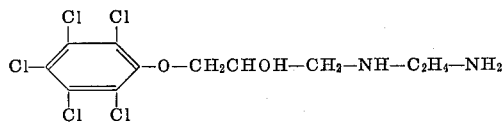

*Example 6*

130 parts of diethylamino-propylamine are reacted with 387 parts of tribromophenyl glycidyl ether at 90–100° C. in the manner described in Example 3, to give a quantitative yield of a brown, viscous resin consisting predominantly of the polyamine of the formula

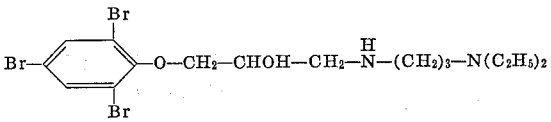

*Example 7*

Test 1.—50 parts of the reaction product described in Example 1 of 1 mol of pentachlorophenyl glycidyl ether and 1 mol of triethylenetetramine are dissolved at 50° C. in 100 parts of an epoxy resin which is liquid at room temperature and contains 5.3 epoxide equivalents per kg., prepared by reacting epichlorohydrin with bis-(4-hydroxyphenyl)-dimethylmethane in the presence of an alkali.

Test 2.—Instead of 50 parts of the reaction product described in Example 1 there are used as curing agent 35 parts of pentachlorophenyl glycidyl ether and 15 parts of triethylenetetramine. To cause the monoglycidyl compound, which is solid at room temperature, to dissolve in the polyepoxy compound described above a temperature of at least 65° C. is required; below this temperature the monoglycidyl compound settles out partly. Even after having added 15 parts of triethylenetetramine (as in Test 1:1 equivalent of amine hydrogen atoms per equivalent of epoxide groups) a temperature of at least 60° C. is needed to produce a homogeneous solution.

The curable casting resin mixtures obtained in this manner are cast in aluminum tubes (40 x 10 x 140 mm.), in Test 1 at 50° C. and in Test 2 at 60° C., and each specimen is heated for 24 hours at 40° C.

One further portion each of the two specimens of casting resin is used to determine the gel time of 100 grams of the epoxy resin+curing agent mixture. For this purpose the specimen of the casting resin of Test 1 is heated to 40° C. and that of Test 2 to 60° C. and both mixtures are cast in aluminum cups of 4 cm. height and 6 cm. diameter.

The gel times and the maximum temperatures reached during the gelling which takes an exothermic course, as well as the properties of the cured casting resin specimens are shown in the following table:

| Test | Gel time and max. temp. of 100 g. of a mixture of epoxy resin and curing agent from 40° C. (Test 1) and 60° C. (Test 2) | Flexural strength | Heat distortion point according to Martens DIN in ° C. | Combustibility |
|---|---|---|---|---|
| 1 | Gel time, 9 mins.; max. temp. 160° C. after 15 minutes. | 12.5 | 67 | Self-extinguishing. |
| 2 | Decomposed with strong smoking after 5 mins.; max. temp. 290° C. | Casting resin specimen decomposed | | |

Another portion of Specimen 1 is used for making cementing tests. Strips of degreased and ground aluminum (170 x 25 x 1.5 mm.; 10 mm. overlap) marketed under the trade name "Anticorodal B" were cemented together at room temperature. The strips so cemented together were cured for 24 hours at 40° C. and then displayed a tensile shear strength of 0.8 kg./mm.²

One further portion each of Specimen 1 was cast over glass plates in a layer about 0.2 mm. thick and cured for 24 hours at 40° C. The resulting flawless, hard films proved stable towards 1 hour's action at room temperature of 5 N-sulfuric acid, 5 N-sodium hydroxide solution, water, acetone and chlorobenzene.

Example 8

*Test 1.*—55.6 parts of the reaction product of 1 mol of 2:4:6-tribromophenyl glycidyl ether and 1 mol of triethylenetetramine described in Example 4 were dissolved as curing agent at 50° C. in 100 parts of the polyepoxy compound used in Example 7 containing 5.3 equivalents of epoxide groups per kg.

*Test 2.*—The polyepoxy compound is first mixed with 20 parts of trixylenyl phosphate and 55.6 parts of the reaction product described in Example 4 are then dissolved at room temperature.

One portion each of the resulting casting resin specimens is cast as described in Example 7 in aluminum tubes, in Test 1 at 40° C. and in Test 2 at 25° C. and cured for 24 hours at 40° C. The properties of the cured casting resin specimens are shown in the following table:

| Test | Impact strength, cm. kg./cm.² | Flexural strength, kg./mm.² | Heat distorsion point according to Martens DIN | Combustibility |
|---|---|---|---|---|
| 1 | 6 | 8 | 60 | Self-extinguishing. |
| 2 | 9 | 14.5 | 56 | Do. |

What is claimed is:

1. A halogen-containing polyamine of the formula

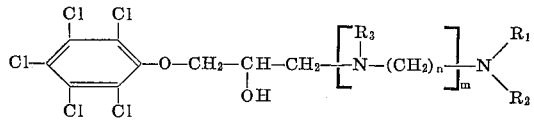

in which $R_1$ $R_2$ and $R_3$ each are selected from the class consisting of hydrogen atom and lower alkyl with 1 to 4 carbon atoms, $n$ is an integer of at least 2 and at the most 6 and $m$ is an integer of at least 1 and at the most 6.

2. The compound of the formula

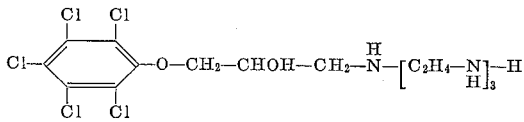

3. The compound of the formula

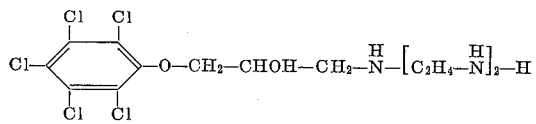

4. The compound of the formula

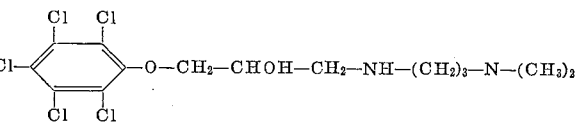

5. The compound of the formula

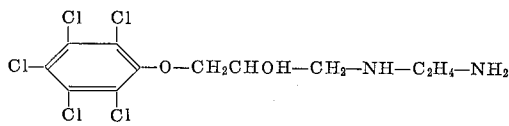

References Cited

UNITED STATES PATENTS

| | | | |
|---|---|---|---|
| 2,500,600 | 3/1950 | Bradley | 260—47 |
| 2,750,427 | 6/1956 | Gaertner | 260—623 |
| 2,803,670 | 8/1957 | Galat | 260—623 |
| 2,817,644 | 12/1957 | Shokal et al. | 260—47 |
| 2,817,675 | 12/1957 | Hofer et al. | 260—570.7 X |
| 2,833,830 | 5/1958 | Rigterink | 260—623 |
| 2,864,775 | 12/1958 | Newey | 260—570.7 |
| 2,890,204 | 6/1959 | Delmonte | 260—47 |
| 3,033,640 | 5/1962 | Hofer et al. | 260—570.7 X |

CHARLES B. PARKER, *Primary Examiner.*

D. N. BURNSTEIN, *Examiner.*

A. L. LIBERMAN, ROBERT V. HINES,
*Assistant Examiners.*